3,099,611
POLYETHYLENE IRRADIATION PROCESS
Kenneth Stevens, Wallington, England, assignor to The Distillers Company Limited, Edinburgh, Scotland, a British company
No Drawing. Filed Sept. 29, 1959, Ser. No. 843,064
Claims priority, application Great Britain Oct. 29, 1958
3 Claims. (Cl. 204—154)

The present invention relates to a process for the production of material from linear polyethylene having improved environmental stress cracking resistance. By "environmental stress cracking" of a polymer sample (hereinafter referred to as stress cracking) is meant the fracturing which results when it is exposed simultaneously to a stress and to a chemical agent which induces cracking. Examples of such agents are oil, soap, alcohol and the like. The stress cracking of linear polyethylene renders it unsuitable as a raw material from which to manufacture many articles for which it would otherwise be eminently suitable.

An object of the present invention is to provide a process for the production of a material from linear polyethylene which retains most of the advantageous physical properties of the linear polyethylene and has an improved stress cracking resistance.

According to the present invention the process for the production of material from linear polyethylene having improved stress cracking resistance comprises irradiating the linear polyethylene with high energy radiation while said linear polyethylene is in contact with vinyl chloride.

Material having improved stress cracking resistance as compared with the starting material can be obtained from any solid, linear polyethylene according to the process of the present invention. Particularly useful results are obtained by the irradiation of linear polyethylene having an average molecular weight above 30,000. By "linear polyethylene" is meant throughout this specification polymeric material derived from the polymerisation of ethylene in which the amount of branching in the polymer molecules is low. Such material may be characterised by its relatively high density, i.e. it has a density greater than 0.94.

The linear polyethylene to be irradiated can be in any size or physical state or in any form of fabrication when the irradiation is commenced. For instance it may be in the form of a powder or of particles of a larger size such as the pellets obtained by chopping up flat sheet or stock linear polyethylene. Alternatively the linear polyethylene to be irradiated in the presence of vinyl chloride may be in the form of a finished article such as a polyethylene sheet, tape, pipe or a moulded article such as a bottle or other type of container.

Any high energy radiation can be used. For example the high energy radiation can be obtained from a cathode ray generator having a circular symmetrical pattern. Other examples of suitable sources of radiation are cathode ray generators having other beam patterns, X-ray generators, or radio-active material such as cobalt 60 as a source of gamma radiation. Sources of alpha and beta and neutron radiation can also be employed.

The linear polyethylene can be irradiated by any of the techniques previously employed for the irradiation of polyethylene provided that it can be surrounded by an atmosphere or liquid medium containing vinyl chloride for at least part of the duration of the irradiation. Most suitably the linear polyethylene is surrounded by liquid vinyl chloride or by a diluent containing dissolved vinyl chloride. Any inert diluent in which vinyl chloride is soluble under the conditions of the irradiation can be used. Examples of suitable liquids are benzene, toluene and similar hydrocarbons. When the linear polyethylene is irradiated in the form of a finished article it is essential that the inert diluent should not cause the linear polyethylene to swell to such an extent under the conditions of the irradiation that it changes its shape.

It is preferred that molecular oxygen should be excluded from the linear polyethylene during irradiation in order to minimise any oxidation which might otherwise take place.

The intensity and duration of the radiation employed can be widely varied according to the size, shape and surface area of the polyethylene sample. With the standard samples of sheet polyethylene described below doses of radiation in the range $1 \times 10^6$ rads to $10 \times 10^6$ rads can give excellent results. Preferably doses in the range $3 \times 10^6$ rads to $7 \times 10^6$ rads are employed for such samples. By a "rad" of radiation is meant throughout this specification the amount of radiation corresponding to an energy absorption in an aqueous solution of 100 ergs/gram.

The following examples illustrate the process of the present invention. The relative stress cracking resistances of the starting linear polyethylene and the material produced according to the process of the present invention were determined by the following procedure.

Standard samples of sheet material were taken having the dimensions 1¾" by ½" by ⅟₁₆" and a rectangular slit measuring ½" x ⅟₃₂" was cut lengthways in the centre thereof. Each test sample was then bent symmetrically through 180° and placed in a test tube having an internal bore of ¾". This tube was then filled with ethyl alcohol to cover the sample and maintained at 45° C., and the time taken until the sample fractured.

*Example 1*

Six test samples of linear polyethylene sold under the trade name of "Marlex 50" (Marlex is a registered trademark) and having an average molecular weight above 30,000 were placed in an irradiation vessel containing 115 cc. of benzene and 30 grams of vinyl chloride and the vessel was sealed under an atmosphere of nitrogen. The total weight of the linear polyethylene in the irradiation vessel was 5.43 grams. The vessel was gently shaken and irradiated for 155 hours at room temperature (~16° C.) with radiation at the dose rate of 38,200 rads per hour. At the end of this period the samples were removed and adsorbed benzene and small traces of polyvinyl chloride were removed. The total weight of the samples at this stage were 6.64 grams. The irradiated samples thus produced were then tested as described above for their stress cracking resistance and it was found that they did not fracture in 1260 hours. A similar six samples which were irradiated in benzene in the absence of vinyl chloride fractured in an average time of 11 hours while completely untreated samples lasted an average time of 15 hours.

*Example 2*

The process of Example 1 was repeated but the total dose of radiation was increased to 6.25 megarads. None of the irradiated samples had fractured under the test conditions within 1,000 hours when the test was discontinued.

It is important that the vinyl chloride should be in contact with the polyethylene during the irradiation as demonstrated by the following comparative experiment:

The process of Example 2 was repeated but the polyethylene was irradiated in the absence of vinyl chloride using a total dose of radiation amounting to 7.12 megarads. At the end of the irradiation period the vinyl chloride was brought into contact with the polyethylene samples. In the stress cracking test the samples fractured after an average time of 36 hours.

I claim:

1. A process which comprises irradiating linear polyethylene of an average molecular weight greater than 30,000 and a density greater than about 0.94 in contact with vinyl chloride with high energy ionizing radiation to a total dose between about $10^6$ rads and $10^7$ rads to produce a linear polyethylene material having substantially improved environmental stress-cracking resistance.

2. A process as set forth in claim 1 wherein the total dose of ionizing radiation to which the linear polyethylene is subjected is between about $3 \times 10^6$ rads and $10^7$ rads.

3. A process which comprises irradiating linear polyethylene of an average molecular weight greater than 30,000 and a density greater than about 0.94 in direct contact with an inert liquid diluent containing dissolved vinyl chloride with high energy ionizing radiation to a total dose between about $10^6$ rads and $10^7$ rads to produce a linear polyethylene material having substantially improved environmental stress-cracking resistance.

References Cited in the file of this patent

FOREIGN PATENTS

| | | |
|---|---|---|
| 1,130,099 | France | Sept. 17, 1956 |
| 546,816 | Belgium | Oct. 6, 1956 |
| 1,181,893 | France | Jan. 12, 1959 |